(12) United States Patent
Noma et al.

(10) Patent No.: US 6,295,313 B1
(45) Date of Patent: Sep. 25, 2001

(54) METHOD FOR CONTROLLING MODEM

(75) Inventors: Nobuhiko Noma, Yokohama; Mitsuhiro Araki, Kawasaki, both of (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/117,177
(22) PCT Filed: Dec. 16, 1997
(86) PCT No.: PCT/JP97/04629
 § 371 Date: Jul. 29, 1998
 § 102(e) Date: Jul. 29, 1998
(87) PCT Pub. No.: WO98/27716
 PCT Pub. Date: Jun. 25, 1998

(30) Foreign Application Priority Data

Dec. 17, 1996 (JP) .................................... 8/336575

(51) Int. Cl.$^7$ ...................................................... H04B 1/38
(52) U.S. Cl. ............................ 375/222; 375/219; 375/225
(58) Field of Search .................................. 375/222, 219, 375/225, 221; 370/252, 253, 235, 236, 248, 498; 379/93.08; 455/67.1, 67.4

(56) References Cited

U.S. PATENT DOCUMENTS 5,170,470  12/1992  Pindar et al. .
5,825,508 * 10/1998  Mukai ................................. 358/412
5,870,429 *  2/1999  Moran, III et al. .................. 375/222

FOREIGN PATENT DOCUMENTS 1-132250  5/1989  (JP) .
5-219341  8/1993  (JP) .
8-223246  8/1996  (JP) .

OTHER PUBLICATIONS

English Language Abstract of JP No. 5–219341.
English Language Abstract of JP No. 1–132250.
English Language Abstract of JP No. 8–223246.
T.30 Annex F Recommendation, pp. 131–138.
T.4 Recommendation, pp. 14–15.

* cited by examiner

Primary Examiner—Stephen Chin
Assistant Examiner—Mohammad Ghayour
(74) Attorney, Agent, or Firm—Greenblum & Bernstein, P.L.C.

(57) ABSTRACT

When the present modem control apparatus detects that the receive level of a probing signal in phase 2 of the pre-communication procedure or a tone signal with a specific frequency in phase 2 of the pre-communication procedure is lower than a prescribed value, it sets the transmission rate of the control channel to a low rate of 1200 bps. In this case, the modem control apparatus sets the transmission rate to 1200 bps through a prescribed bit of the MPh signal in the communication control procedure and performs the setting that will not permit communications with the answer modem at different transmission rates, through the second prescribed bit of said MPh signal, and notifies those settings to the answer modem, thus carrying out communications at a lower transmission rate.

11 Claims, 6 Drawing Sheets

FIG. 2
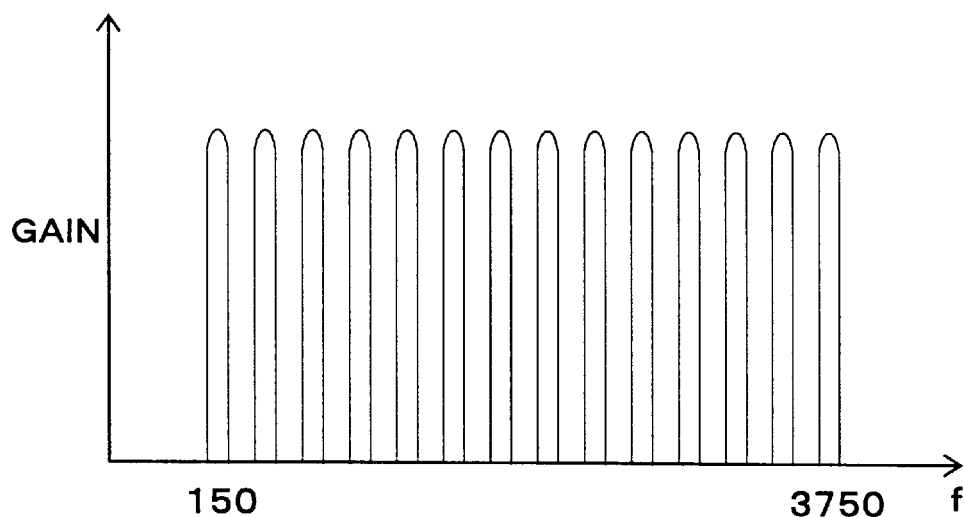
(A)
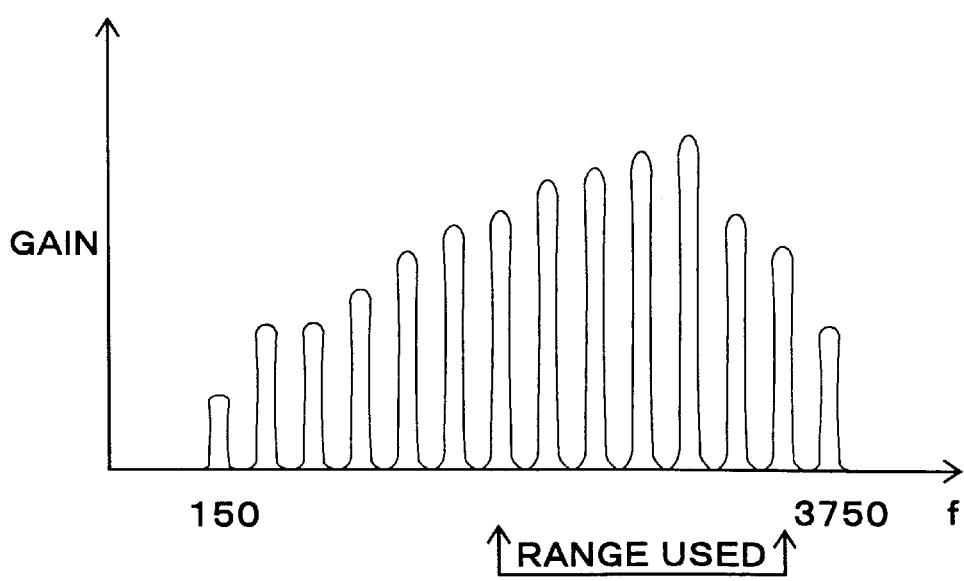
(B)

FIG. 5
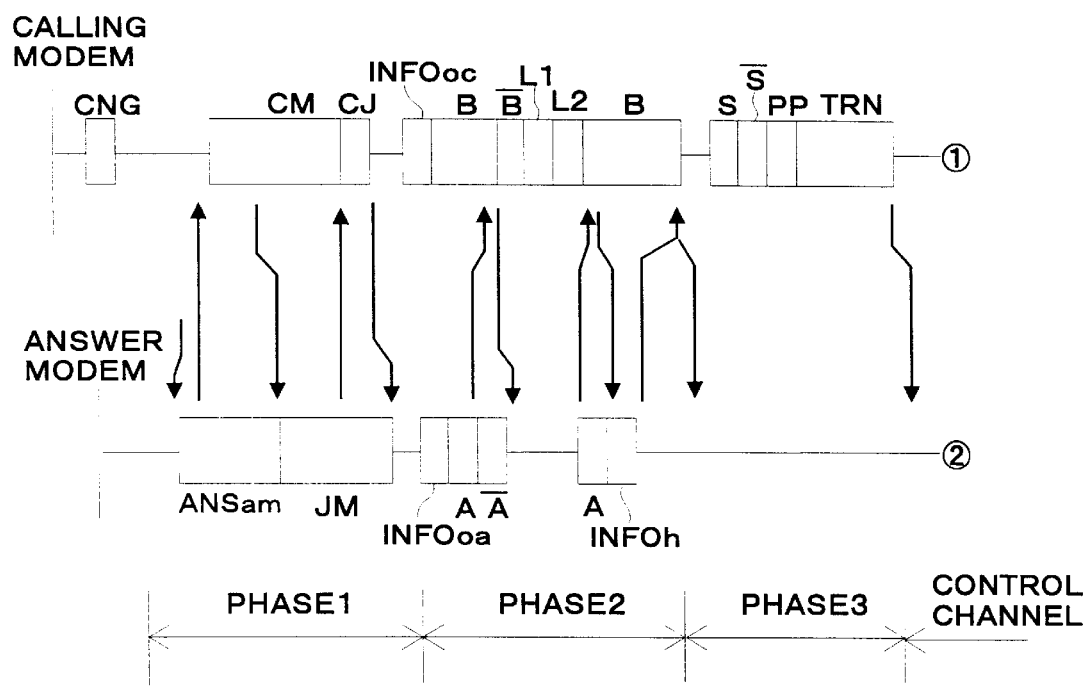
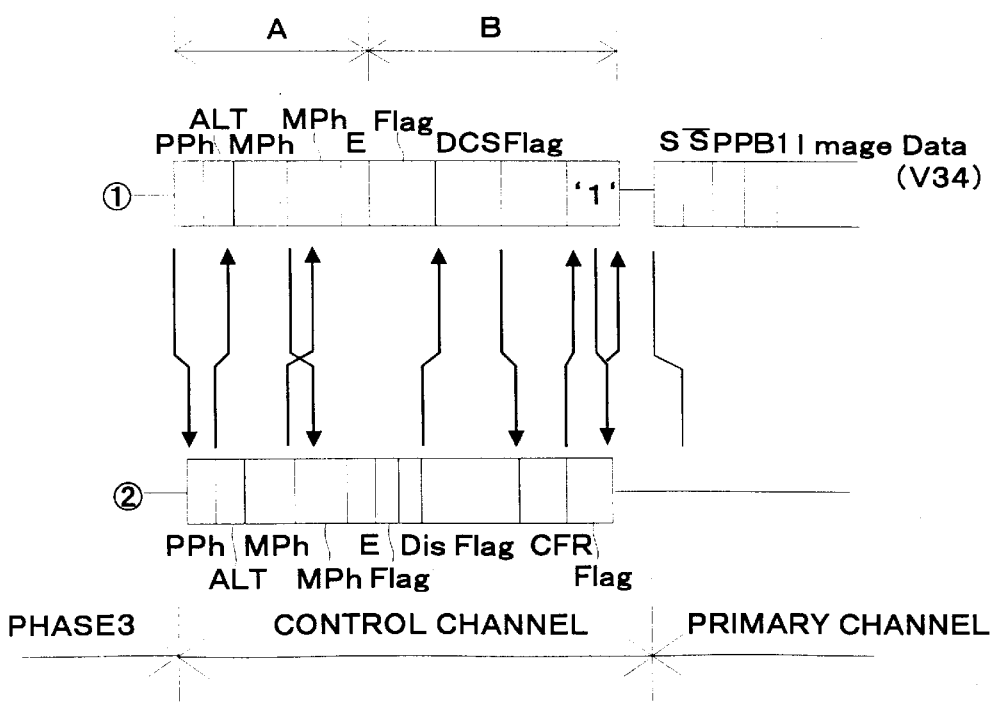

METHOD FOR CONTROLLING MODEM

TECHNICAL FIELD

The present invention relates to modem control methods, especially those applicable to a V.34 facsimile modem communicating in compliance with the T.30 ANNEX-F procedure based on the ITU (International Telecommunication Union) V.34 facsimile modem Recommendation.

BACKGROUND ART

According to the communication protocol based on the current V.34 Recommendation and T.30 Recommendation ANNEX-F, modems operate in full-duplex mode in a control channel where communication procedures are exchanged and operate in half-duplex mode in a primary channel to transmit image information. FIG.5 shows the communication protocol.

Phase 1 is a section where a CM signal (calling menu signal) and JM signal (common menu signal) are exchanged. This section selects a modulation mode available to the calling and answer modems.

Phase 2 is a section called "line probing." L1 and L2 are signals to probe the line characteristic viewed from the answer modem each including 21 single-frequencies from 150 Hz to 3750 Hz. INFO is an information signal indicating communication capacity and signals A, A bar, B, and B bar indicate the ACK (Acknowledge) signals that receive INFO and are signals to adjust the transmit/receive timing of signal L1 and signal L2.

Phase 3 is a primary channel preparation stage which transmits V.34 image signal data which will be issued in a later stage and corresponds to the period of transmission of a long training signal (long synchronization signal). The frequency band (or symbol rate) used in this long training signal is determined based on the line characteristic probed by the L1 and L2 signals in phase 2.

The control channel includes two groups of signals; first-half section A and second-half section B. Section A is mainly for exchanging operating parameters of the modem and it is in this section that the transmission rate of the image signal data transmitted through the primary channel which follows the control channel is determined. Section B is a section to exchange control information as the facsimile terminal and it is in this section that control commands such as DIS (Digital Identification Signal) and DCS (Digital Command Signal) described in the T.30 Recommendation are exchanged.

An MPh signal in section A contains a bit (bit 50 in MPh) which determines whether or not to accept asymmetric transmission rates of 1200 bps and 2400 bps as the transmission rate of section B. The MPh signal also includes another bit (bit 27 in MPh) which requests the answer modem to transmit section B at either 1200 bps or 2400 bps.

If bit 50 in MPh of both the transmitter and receiver is "1", communication is carried out at an asynchronous transmission rate and if bit 50 in MPh of either the transmitter or receiver is "0", communication is carried out at the same transmission rate.

For both 1200 bps and 2400 bps, the control channel at the calling modem uses a 1200 Hz carrier and a band of 1800 Hz or lower, while the control channel at the answer modem uses a 2400 Hz carrier and a band of 1800 Hz or higher.

However, the T. 30 ANNEX-F currently does not accept asymmetric communications (communications carried out at different transmission rates between the calling and answer modems) in FAX transmissions and stipulates that MPh bit 50 is set to "0".

When a symmetric rate transmission is selected, if the requested transmission rate declared by bit 27 in the MPh signal differs between the calling and answer modems, it is stipulated that the transmitter and receiver should carry out communications in section B according to the slower transmission side.

In a current FAX which incorporates a V.34 modem, the transmission rate of section B is preset to either 1200 bps or 2400 bps and it is possible to select either one according to the line situation.

The primary channel contains facsimile image information data and a short training signal (short synchronization signal) which precedes the facsimile image information data. The data signal rate of this image information part is determined by the exchange of the aforementioned MPh signal of section A of the control channel.

FIG. 6 is a section diagram of a conventional receive circuit that receives facsimile control signals. A receive signal passes through AGC (Automatic Gain Control) circuit 1, A/D converter 2 and is input to QAM demodulator 3, 1200 Hz detection circuit 4, 2400 Hz detection circuit 5 and FFT circuit 6.

QAM demodulator 3 is a QAM (Quadrature Amplitude Modulation) demodulator which detects the modem performance of phase 2, line probing result and INFOoc and INFOoa, etc. of an INFO sequence used to exchange data mode (image information transmission mode) modulation parameters, and demodulates them.

1200 Hz detection circuit 4 and 2400 Hz detection circuit 5 detect 1200 Hz and 2400 Hz signals to capture signals in section B and section A in phase 2.

FFT circuit 6 is a fast Fourier transformation circuit which analyzes the frequency characteristic of line probing signals L1 and L2 in phase 2 and determines the symbol rate (frequency band) of a primary channel signal used in phase 3 and thereafter.

However, the conventional technology above has the following problems.

The transmitter transmits image information after selecting the optimum data signal rate according to the line situation by evaluating the line characteristic using the line probing signal. The transmitter fixes the data transmission rate in control channel section B at either 1200 bps or 2400 bps set beforehand.

In the case of 1200 bps, noise resistance is considerably high to such an extent that it can be an excessive quality for normal lines, whereas its data transmission rate is low. On the other hand, with 2400 bps, the opposite is the case. Therefore, transmission of the control channel with a noisy line often ends up repeating data retransmission. The difference of noise resistance between 1200 bps and 2400 bps communications of the control channel is approximately 7 dB.

In communications of the control channel above, the symbol transmission rate is as low as 600 baud, and thus it has a strong resistance in line link characteristics.

However, since band separation type full-duplex communications are used for the control channel, the receive signal level in either a high band of 1800 Hz or higher or a low band of less than 1800 Hz remains as low as close to −43 dBm specified in the T.4 Recommendation. On the other hand, a signal transmitted by the calling modem may be reflected from the exchange and introduced to the demodulator as an echo. Since the gain of this echo signal may be greater than the receive signal level, either the calling modem or answer modem will have lower reception noise resistance. Therefore, in the case of a transmission rate of 2400 bps, there is a problem of extremely high probability of bit errors in receive data of the receiver.

DISCLOSURE OF INVENTION

The present invention has been implemented in view of the problems above. Its objective is to provide modem control methods which will allow the transmission rate of the control channel to be selected according to the line situation.

The other objective is to make it possible to select the transmission rate of the control channel reliably and simply using the procedure defined in the ITU Recommendation.

These objectives are achieved by a modem operating according to the Recommendation V.34 procedure by setting the transmission rate of the control channel to as low as 1200 bps when it detects that the receive level of the probing signal in phase 2 of the pre-communication procedure or a tone signal at a specific frequency in phase 2 is lower than a prescribed value.

These objects are also achieved by the modem setting the transmission rate to 1200 bps using the prescribed bit of the MPh signal and using another prescribed bit of the MPh signal to perform the settings that will not permit communications with the answer modem at different transmission rates, notifying the answer modem of those settings, thus implementing communications at a lower transmission rate.

BRIEF DESCRIPTION OF DRAWINGS

FIGS. 2A and 2B shows explanatory diagrams of probing signals L1 and L2;

FIG. 5 is a schematic diagram showing a V.34 facsimile modem and overall T.30 ANNEX-F procedure.

BEST MODE FOR CARRYING OUT THE INVENTION

With reference now to the attached drawings, the embodiments of the present invention are explained below.

Figure 1:
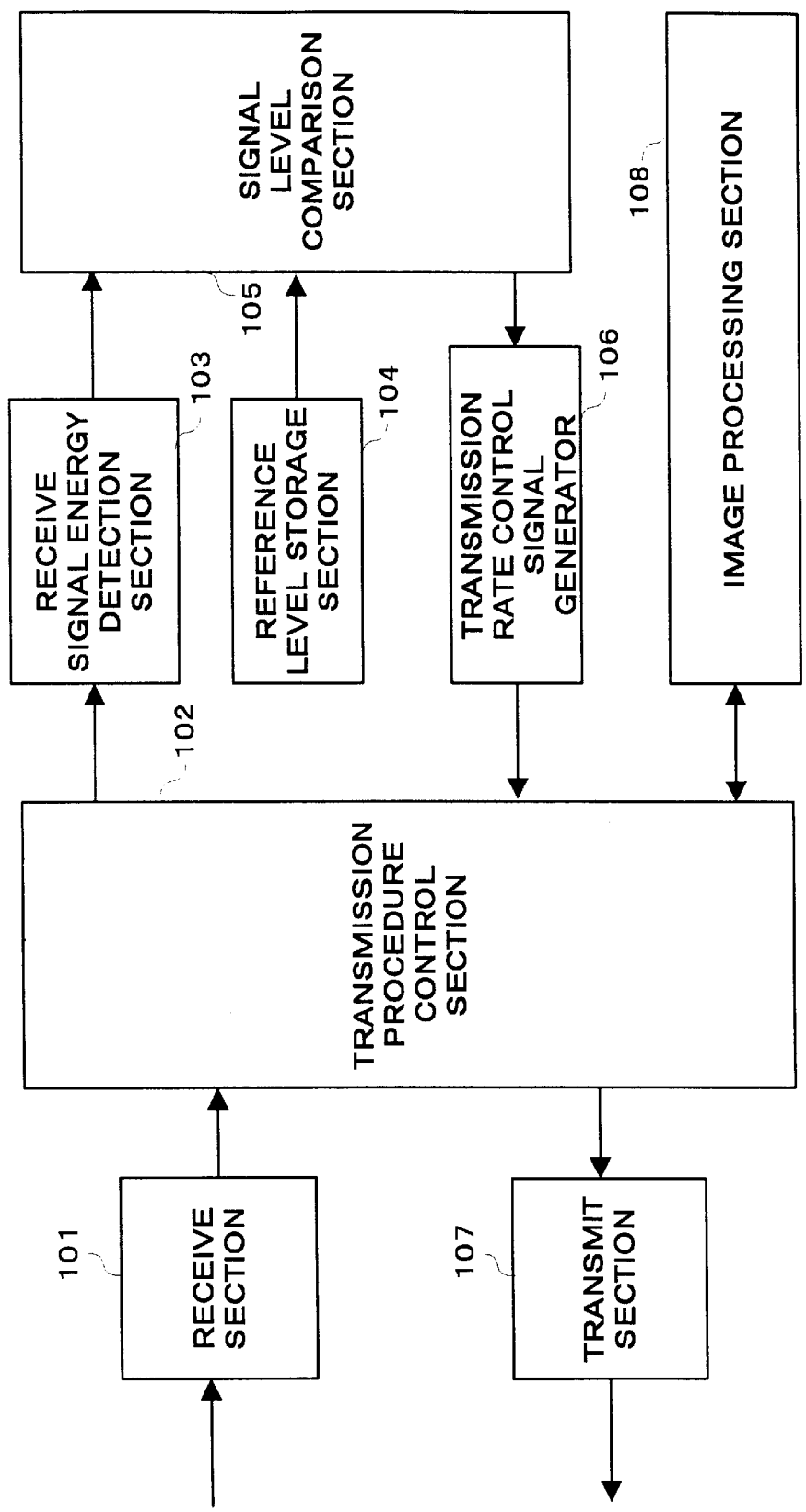
FIG. 1 is a section diagram showing the overall configuration of the modem control apparatus that implements the modem control method of the present invention.

FIG. 1 is a section diagram that gives an outline of the entire modem control apparatus that implements the modem control method of the present invention.

Modem control apparatus 100 comprises receive section 101, communication procedure control section 102, receive signal energy detection section 103, reference level storage section 104, signal level comparison section 105, transmission rate control signal generator 106, transmit section 107, and image information processing section 108.

The pre-communication procedure is switched by communication procedure control section 102, receive section 101 and transmit section 107. For receive signal energy detection section 103, a reference signal with a specific frequency in the pre-communication procedure input from receive section 101 is input. This receive signal energy detection section 103 analyzes the receive level of the input reference signal and outputs it to signal level comparison section 105. This signal level comparison section 105 compares the receive level of the analyzed reference signal with a prescribed value stored in reference level storage section 104 and judges its receive level. The judgment result is input to transmission rate control signal generator 106, which in turn carries out the following processing according to the judgment result.

If the receive level of the reference signal is higher than the prescribed value, transmission rate control signal generator 106 continues to exchange control signals of the control channel at the same transmission rate. On the other hand, if the receive level of the reference signal is lower than the prescribed value, transmission rate control signal generator 106 generates a control signal which will set the transmission rate to a lower value and sends it to the answer modem through communication procedure control section 102.

Thus, the pre-communication control procedure thereafter will be carried out at a lower transmission rate. When the pre-communication control procedure is completed, image information processing section 108 carries out transmission/reception with the answer modem.

The reference signal with a specific frequency above can be, for example, line probing signals L1 and L2 in phase 2 of the pre-communication control procedure of the V.34 facsimile modem operating in compliance with the ITU Recommendation T.30 ANNEX-F.

FIG. 2 shows the L1 and L2 signals in phase 2 and (A) indicates the signal level of the calling modem and (B) indicates the signal level of the answer modem. As shown in the figures, the L1 and L2 signals each consist of 21 simultaneously transmitted single frequencies from 150 Hz to 3750 Hz.

The calling modem transmits signals of the same level as shown in (A). These signals attenuate at the answer modem due to the line situation as sown in (B). Thus, the answer modem measures the incoming level in a lower and higher frequency bands and if the receive signal level is estimated to be lower than the prescribed value in either frequency band, it requests the calling modem to carry out communications at a transmission rate of 1200 bps.

The modem control methods related to the embodiments of the present invention are explained more specifically below.

(Embodiment 1)

Figure 3:
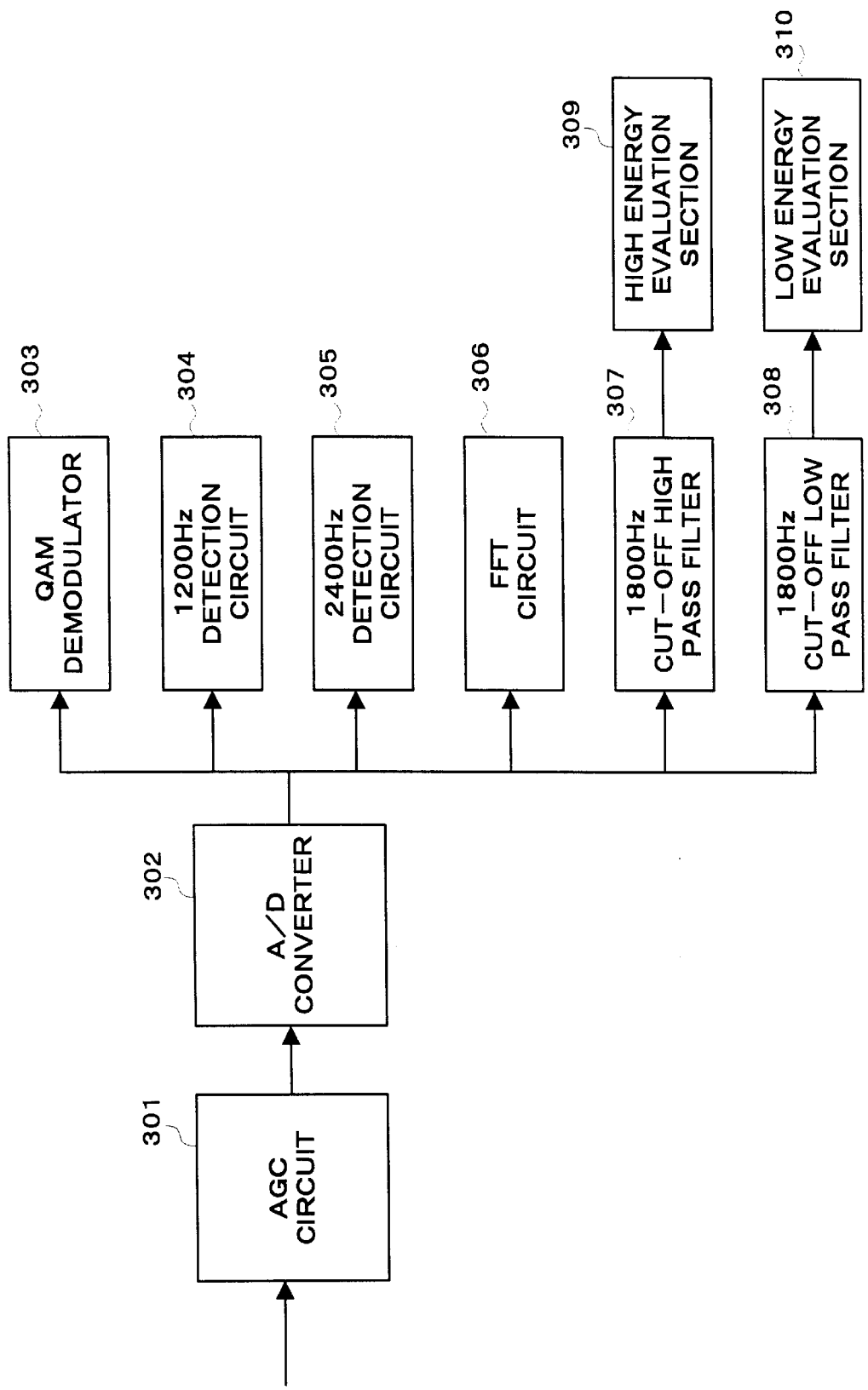
FIG. 3 is a section diagram of the receive circuit in phase 2 of the facsimile control procedure implementing the modem control method in Embodiment 1 of the present invention.

FIG. 3 is a section diagram showing the configuration of the receive section of probing signals L1 and L2 in phase 2 of the V.34 facsimile modem control procedure that implements the modem control method related to Embodiment 1 of the present invention.

A receive signal. passes through AGC (Automatic Gain Control) circuit 301, A/D converter 302 and is input to QAM demodulator 303, 1200 Hz detection circuit 304, 2400 Hz detection circuit 305 and FFT circuit 306.

QAM demodulator 303 is a QAM (Quadrature Amplitude Modulation) demodulator which detects the modem performance in phase 2, line probing result and INFOoc and INFOoa, etc. of an INFO sequence used to exchange data mode (image information transmit mode) modulation parameters, and demodulates them.

1200 Hz detection circuit 304 and 2400 Hz detection circuit 305 detect 1200 Hz and 2400 Hz signals to capture signals in section B and section A in phase 2, respectively.

FFT circuit 306 is a fast Fourier transformation circuit which analyzes the frequency characteristic of line probing signals L1 and L2 in phase 2 and determines the symbol rate (frequency band) of a primary channel signal used in phase 3 and thereafter.

Figure 6:
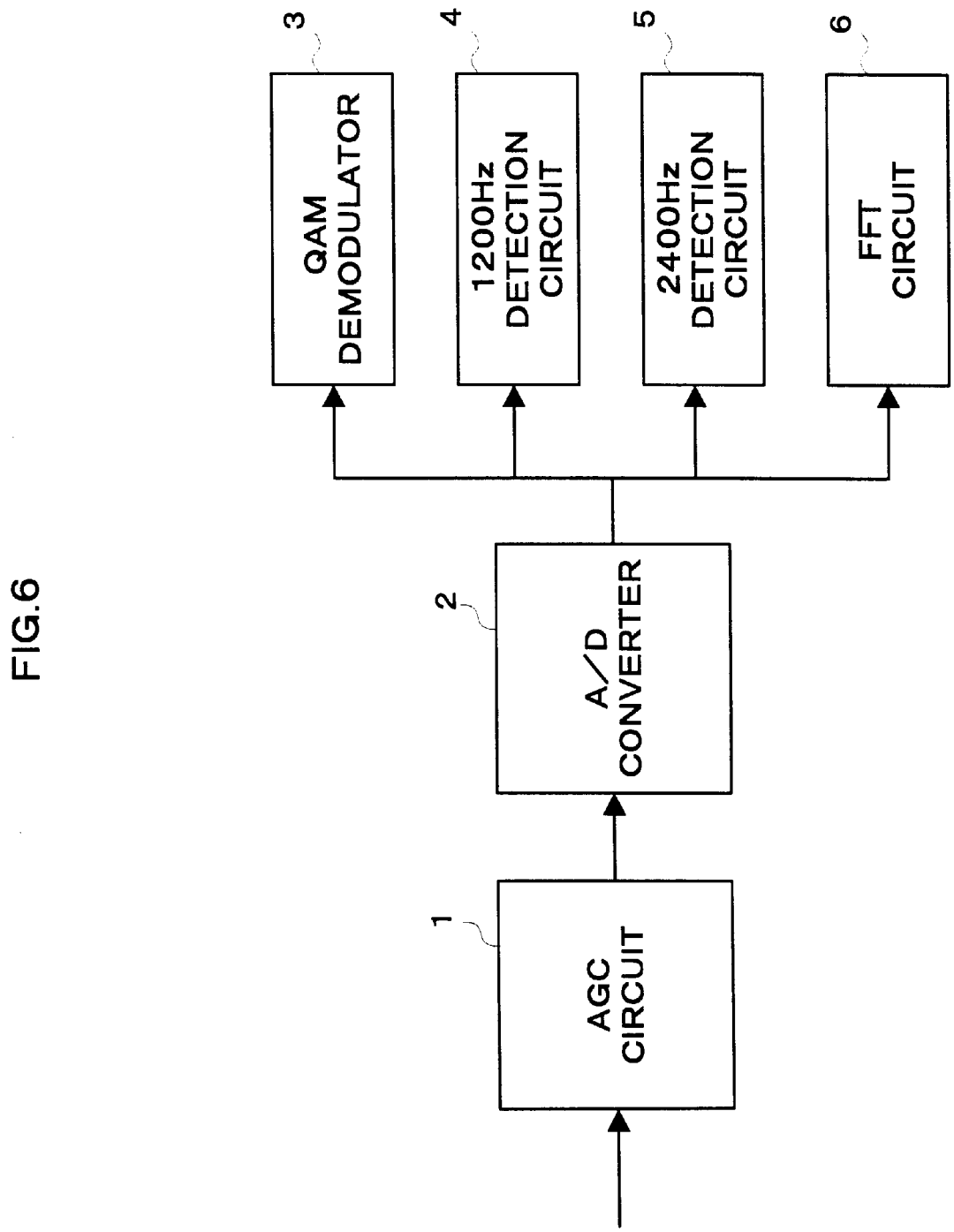
FIG. 6 is a section diagram of the receive circuit in phase 2 of the facsimile control procedure implementing a conventional modem control.

The circuits above from AGC circuit 301 to FFT circuit 306 are the same as the circuits described in FIG. 6.

1800 Hz cut-off high pass filter 307 is the filter that allows signals in a band of 1800 Hz or higher used in the control channel by the answer modem and calling modem to pass. 1800 Hz cut-off low pass filter 308 is the filter that allows signals in a band of less than 1800 Hz used by the answer modem and calling modem to pass.

High energy evaluation section 309 measures the energy of signals that pass 1800 Hz cut-off high pass filter 307. Low energy evaluation section 310 measures the energy of signals that pass 1800 Hz cut-off low pass filter 308.

The operation of the receive circuit configured as above is explained using the communication protocol diagram in FIG. 5.

First, the data modulation mode used for transmission/reception in phase 1 in which a CM signal and JM signal are exchanged is selected. Then, in phase 2, line probing to probe the line characteristic at the answer modem is carried out.

In phase 2, the answer modem receives an INFOoc signal and demodulates the INFOoc signal using QAM demodulator 303. Then, the answer modem receives a B signal and B bar signal using 1200 Hz detection circuit 304. These are sent in response to an A signal sent from the answer modem and A bar signal sent from the calling modem. These B signal an B bar signal are 1200 Hz signals with phase 0 degree and phase 180 degree and become timing signals to generate a non-signal section to receive probing signals such as L1 signal and L2 signal. This allows the answer modem to receive the L1 signal and L2 signal without contention wish the control signal transmitted.

The answer modem then receives the L1 signal and L2 signal and inputs them to FFT circuit 306 and analyzes the frequency characteristic of the line. From this analysis result the answer modem determines the symbol rate of the V.34 primary channel signal in phase 3.

On the other hand, the L1 signal and L2 signal pass through 1800 Hz cut-off high pass filter 307 and 1800 Hz cut-off low pass filter 308 simultaneously and are input to high energy evaluation section 309 and low energy evaluation section 310.

High energy evaluation section 309 and low energy valuation section 310 measure the receive signal energy levels in the high frequency band and low frequency band of the L1 signal and L2 signal input to determine whether each level is as low as close to −43 dBm which is the set operation level of the T.4 Recommendation.

If the measurement result of high energy evaluation section 309 and low energy evaluation section 310 shows that at least one of the high energy or low energy side is close to −43 dBm, the answer modem notifies the calling modem to carry out communications at 1200 bps. To be concrete, this notification is performed by setting bit 27 of the MPh signal in section A of the control channel first-half section after phase 3 to "0". The calling modem operates so that it receives the control channel data transmitted at a transmission rate of 1200 bps by analyzing bit 27 of the received MPh signal.

Measurements by high energy evaluation section 309 and low energy evaluation section 310 above are only carried out by the answer modem. However, as a general characteristic of a public telephone network, if the receive level at the answer modem is low, the receive level of the calling modem is also estimated to be low. Therefore, if the measurement result at the answer modem shows that the receive level of either the high energy side or low energy side is low, receive noise resistance in the control channel is likely to be reduced at either the calling modem or answer modem, and thus the transmission rate is switched.

Furthermore, since communications by the above control procedure are carried out by a facsimile control procedure based on the T.30 ANNEX-F, no asymmetric rate communication (transmission rate differs between the calling and answer modems) is accepted. The answer modem indicates the calling modem that no asymmetric rate communications will be carried out by setting bit 50 of the MPh signal in the control channel to "0". When it receives this MPh signal, the calling modem operates so that communication of the control channel may be carried out at a transmission rate of 1200 bps which is highly resistant to noise irrespective of whether bit 27 of the MPh signal is "0" or "1".

In the case that the communication cable from the facsimile terminal to a remote station exceeds 10 km, the 2400 Hz carrier used for the control channel of the answer modem may attenuate considerably with respect to the 1200 Hz carrier used for the control channel of the calling modem. The present invention demonstrates its effects particularly in such a case.

(Embodiment 2)

Figure 4:
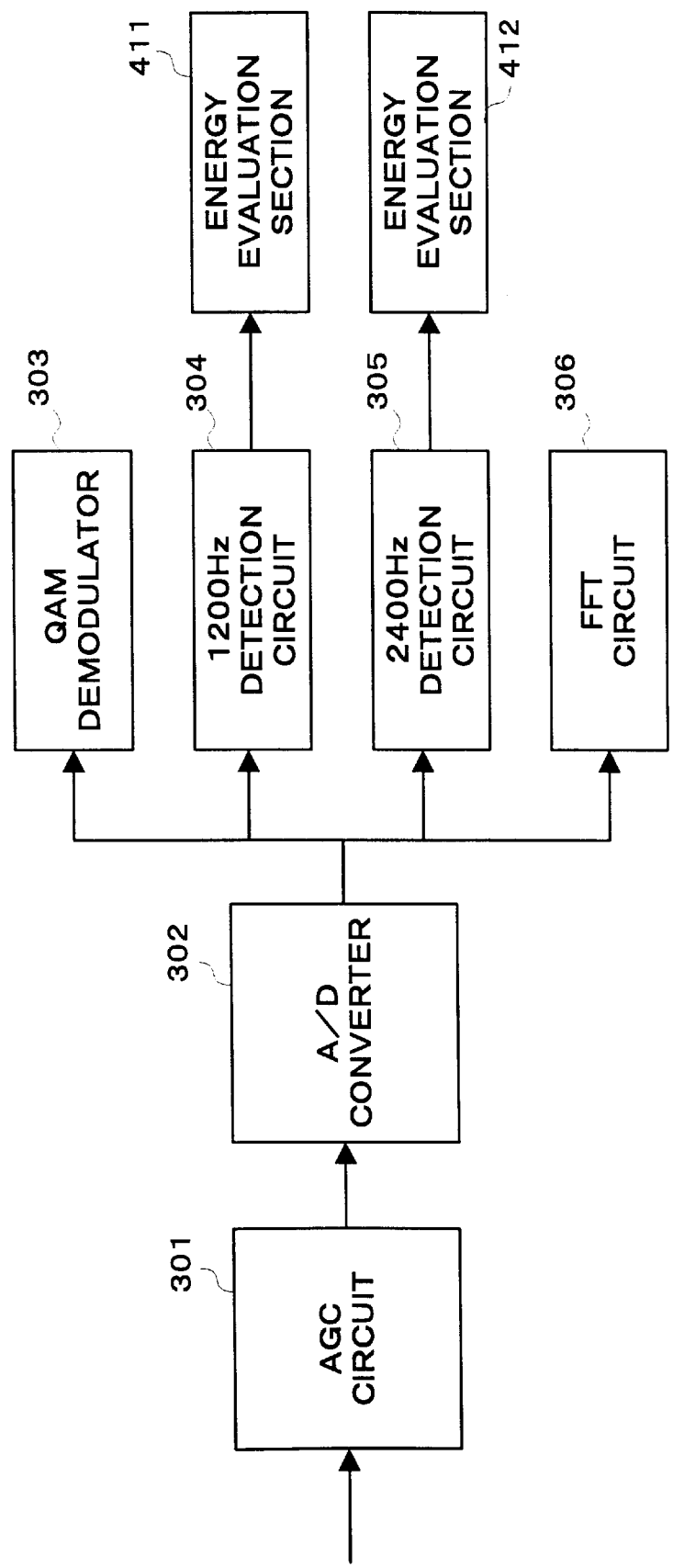
FIG. 4 is a section diagram of the receive circuit in phase 2 of the facsimile control procedure implementing the modem control method in Embodiment 2 of the present invention.

FIG. 4 is a section diagram showing the configuration of the receive section of probing signals L1 and L2 in phase 2 according to the V.34 facsimile modem control procedure which implements the modem control method related to Embodiment 2 of the present invention. FIG. 4 shows a receive circuit of the answer modem and the circuits from AGC circuit 301 to FET circuit 306 are the same as the receive circuits described in Embodiment 1. In Embodiment 2, 1200 Hz detection circuit 304 and 2400 Hz detection circuit 305 are each followed by an energy evaluation section. This eliminates the necessity of providing a 1800 Hz cut-of f high pass filter 307 and 1800 Hz cut-qff low pass filter separately as in the case of Embodiment 1.

Energy evaluation section 411 is a circuit for evaluating energy of the receive signal detected by 1200 Hz detection circuit section 304 and energy evaluation section 412 is a circuit for evaluating energy of the receive signal detected by 2400 Hz detection circuit section 305.

The receive circuits above operate as follows:

In FIG. 4, QAM demodulator 303 of the answer modem receives an INFOoc signal in phase 2 and demodulates that signal. Then, 1200 Hz detection circuit 304 receives a tone B signal and tone B bar signal. The tone B and tone B bar signals are normally 1200 Hz timing signals with phase 0 degree and phase 180 degree, respectively as explained above.

After detecting the tone B bar signal, the answer modem receives the L1 signal and L2 signal and analyzes the frequency characteristic of the line through FFT circuit 306. Then, it determines the symbol rate of the primary channel signal shown in FIG. 4 according to the frequency characteristic of the analyzed line. At the same time, it inputs the received data of tone B and tone B bar signals to energy evaluation circuit 411 and measures the energy level of low frequency band receive signals.

On the other hand, the calling modem also has a receive apparatus similar to the receive apparatus shown in FIG. 4, performing the same control as the apparatus of the answer modem. That is, QAM demodulator 303 of the answer modem receives an INFOoc signal in phase 2 and demodulates it. Then, the answer modem receives a tone A signal and tone A bar signal through 2400 Hz detection circuit 305. After the tone A bar signal is detected, the answer modem transmits the tone B signal and tone B bar signal, and waits the reception of the tone A signal again while transmitting the L1 and L2 signals. In parallel with these operations, it inputs the receive data of the tone A signal and tone A bar signal to energy evaluation circuit 412 and measures the energy level of high frequency band receive signals.

In this way, the calling modem measures the 2400 Hz signal, while the answer modem measures the 1200 Hz signal, examining whether each signal is as low as close to −43 dBm which is the minimum operation level specified by the T.4 Recommendation. When either calling modem or answer modem detects that the receive signal level is close to −43 dBm, either modem which has detected that the receive level is low in section A of the first-half of the control channel will set bit 27 of the MPh signal to "0" and request the opposite modem for communications through the control channel at 1200 bps.

Since the entire control procedure is applicable to communications based on the T.30 ANNEX-F, the modem that has detected that the level of the receive signal from the opposite modem sends an MPh signal by setting bit 50 of the Mph signal which declares asymmetric rate communication to "0". The opposite modem that has received this MPh signal cannot help but respond to communications at a transmission rate of 1200 bps, and thus the calling and answer modems will carry out communications through the control channel at 1200 bps which is mutually highly resistant to noise.

As seen above, the present invention allows communications at 1200 bps which is highly noise resistant on a noisy line, while communications using the control channel at high rate of 2400 bps when there is little signal attenuation.

INDUSTRIAL APPLICABILITY

The modem control methods in the present invention are suitable for transmitting/receiving image information using V.34 facsimile modems and especially suitable for facsimile apparatuses using telephone lines whose line quality is likely to deteriorate.

What is claimed is:

1. A modem control method applicable to a V.34 facsimile modem which operates in compliance with the ITU Recommendation T.30 ANNEX-F for a calling modem and an answering modem mutually connected via a communication line, the modem control method comprising:

receiving a signal having a specific frequency inserted in a communication control procedure;

comparing a level of the received specific frequency signal with a predetermined value;

carrying out communications at a lower transmission rate when the comparing indicates that the level of the received signal is lower than the predetermined value, wherein the specific frequency signal includes probing signals L1 and L2 in a pre-communication procedure transmitted from the calling modem, and wherein both first setting of a transmission rate and second setting that determines whether communications between the calling modem and the answering modem are permitted be at different transmission rates are carried out by assigning the first and second settings to different bits in a MPh signal of a control channel, the MPh signal being used for exchanging operating parameters between the calling and answering modems and for determining a transmission rate of signals transmitted through a primary channel that follows the control channel, and wherein, when a current transmission rate of the control channel is 2400 bps, the MPh signal requests the calling modem to communicate at a transmission rate of 1200 bps.

2. A modem control method applicable to a V.34 facsimile modem which operates in compliance with the ITU Recommendation T.30 ANNEX-F for a calling modem and an answering modem mutually connected via a communication line, the modem control method comprising:

receiving a signal having a specific frequency inserted in a communication control procedure;

comparing a level of the received specific frequency signal with a predetermined value;

carrying out communications at a lower transmission rate when the comparing indicates that the level of the received signal is lower than the predetermined value, wherein, when levels of probing signals L1 and L2 received from the calling modem are lower than the predetermined value, carrying out of communications at the lower transmission rate comprises:

setting the lower transmission rate to 1200 bps through a first predetermined bit of a MPh signal in a control channel, the MPh signal being used for exchanging operating parameters between the calling and answering modems and for determining a transmission rate of signals transmitted through a primary channel that follows the control channel;

prohibiting communications between the calling modem and the answering modem at different transmission rates, through a second predetermined bit of the MPh signal; and notifying the calling modem of the setting of the lower transmission rate and of the prohibition of communications at different transmission rates.

3. The modem control method according to claim 2, wherein the first predetermined bit is bit 27 of the MPh signal and the second predetermined bit is bit 50 of the MPh signal.

4. A modem control method applicable to a V.34 facsimile modem which operates in compliance with the ITU Recommendation T.30 ANNEX-F for a calling modem and an answering modem mutually connected via a communication line, the modem control method comprising:

receiving a signal having a specific frequency inserted in a communication control procedure;

comparing a level of the received specific frequency signal with a predetermined value;

carrying out communications at a lower transmission rate when the comparing indicates that the level is lower than the predetermined value, wherein the specific frequency signal is one of 1200 Hz and 2400 Hz tone signals in a pre-communication procedure transmitted from the answering modem, wherein both first setting of a transmission rate and second setting that determines whether communications between the calling modem and the answering modem at different transmission rates are permitted are carried out by assigning the first and second settings to different bits in an MPh signal of a control channel, the MPh signal being used for exchanging operating parameters between the calling and answering modems and for determining a transmission rate of signals transmitted through a primary channel that follows the control channel, and wherein, when a current transmission rate of the control channel is 2400 bps, the MPh signal requests the answering modem for communications at a transmission rate of 1200 bps.

5. A modem control method applicable to a V.34 facsimile modem which operates in compliance with the ITU Recommendation T.30 ANNEX-F for a calling modem and an answering modem mutually connected via a communication line, the modem control method comprising:

receiving a signal having a specific frequency inserted in a communication control procedure;

comparing a level of the received specific frequency signal with a predetermined value;

carrying out communications at a lower transmission rate when the comparing indicates that the level of the received signal is lower than the predetermined value, wherein if a level of one of 1200 Hz and 2400 Hz tone signals received from the calling modem is lower than the predetermined value, carrying out of communications at the lower transmission rate comprises:

setting the lower transmission rate to 1200 bps through a first predetermined bit of an MPh signal in a control channel, the MPh signal being used for exchanging operating parameters between the calling and answering modems and for determining a transmission rate of signals transmitted through a primary channel that follows the control channel;

prohibiting communications between the calling modem and the answering modem at different transmission rates, through a second predetermined bit of the MPh signal; and notifying the calling modem of the setting of the lower transmission rate and of the prohibition of communications at different transmission rates.

6. The modem control method according to claim 5, wherein the first predetermined bit is bit 27 of the MPh signal and the second predetermined bit is bit 50 of the MPh signal.

7. A modem control apparatus which is provided for communication between a calling modem and an answering modem mutually connected via a communication line and is applicable to a V.34 facsimile modem which operates in compliance with the ITU Recommendation T.30 ANNEX-F, the modem control apparatus comprising:

an energy detector that receives a reference signal having a specific frequency inserted in a communication control procedure and that detects energy of the reference signal; a comparator that compares a level of the detected energy of the reference signal with a predetermined reference level;

a controller that transmits a control signal to carry out communications at a lower transmission rate when a result of the comparison by the comparator indicates that the level of the reference signal is lower than the predetermined reference level, wherein the specific frequency reference signal includes one of probing signals L1 and L2 in a pre-communication procedure transmitted from the calling modem and one of 1200 Hz and 2400 Hz tone signals in the pre-communication procedure transmitted from the answering modem, and wherein the controller sets a transmission rate to 1200 bps through a first predetermined bit of an MPh signal in a control channel, prohibits communication between the calling modem and the answering modem at different transmission rates through a second predetermined bit of the MPh signal, and notifies the answering modem of the lower transmission rate and of the prohibition of communication at different transmission rates, so as to carry out communications at a lower transmission rate, the MPh signal being used for exchanging operating parameters between the calling and answering modems and for determining a transmission rate of signals transmitted through a primary channel that follows the control channel.

8. A facsimile apparatus that includes the modem control apparatus of claim 7.

9. A modem apparatus for communication between a calling modem and an answering modem, comprising:

an energy detector that receives a reference signal from the calling modem in a communication control procedure, the reference signal having a specific frequency, and that detects an energy of the specific frequency reference signal;

a comparator that compares a level of the detected energy of the specific frequency reference signal with a predetermined reference level;

a controller that, when the comparison by the comparator indicates that the detected energy level is lower than the predetermined reference level and a current transmission rate is a higher transmission level, transmits a MPh signal of a control channel to the calling modem, the MPh signal including a first bit requesting communication at a lower transmission rate, and a second bit indicating that communications between the calling modem and the answering modem at different transmission rates are prohibited, the MPh signal being used for exchanging operating parameters between the calling and answering modems and determining a transmission rate of signals transmitted through a primary channel that follows the control channel.

10. A facsimile apparatus including the modem apparatus of claim 9.

11. The modem apparatus according to claim 9, wherein the higher transmission level is 2400 MHz and the lower transmission level is 1200 MHz.

* * * * *